March 15, 1966     H. BENSON     3,239,951
EDUCATIONAL DEVICE OR TOY
Original Filed May 16, 1962
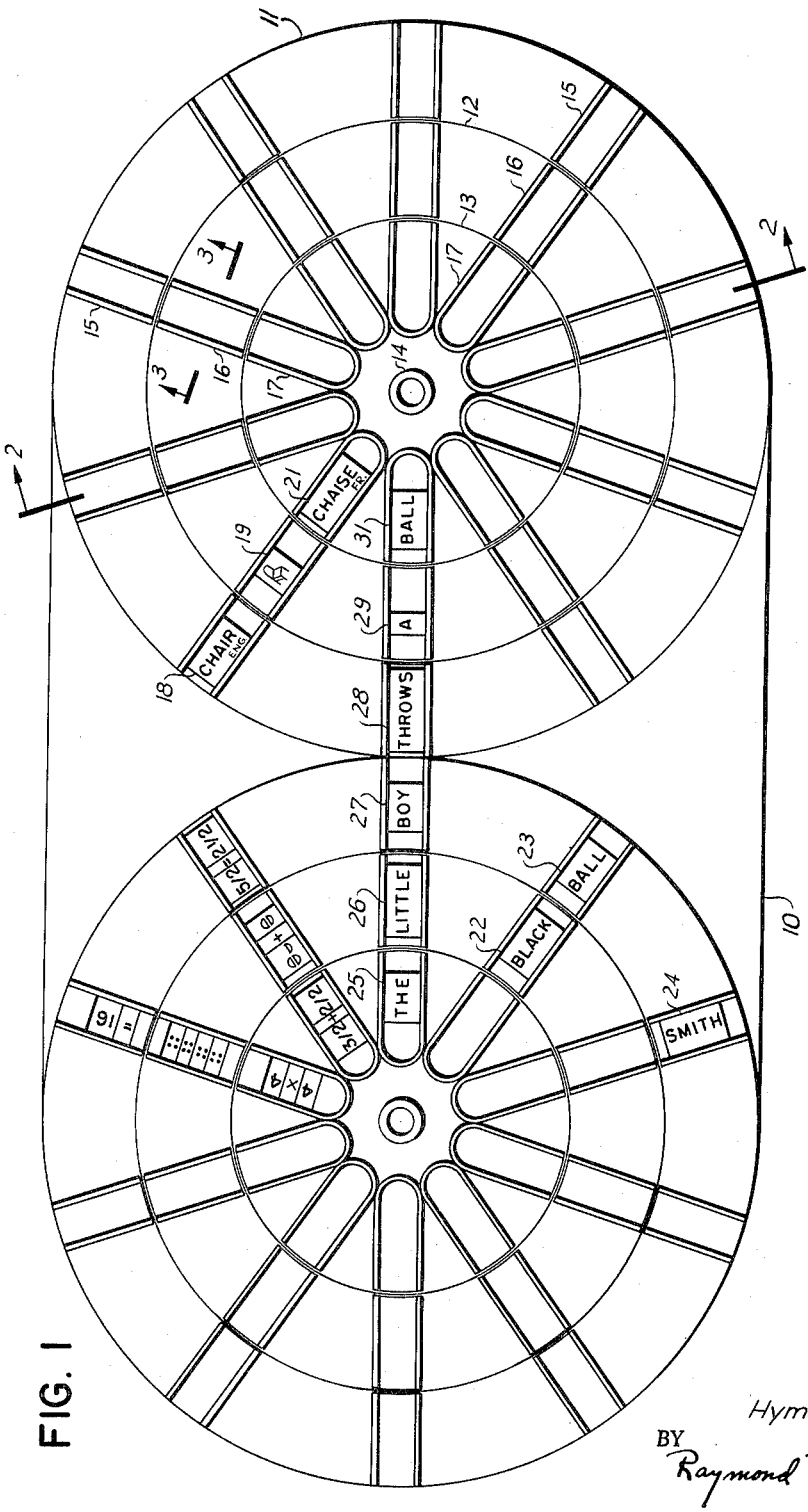
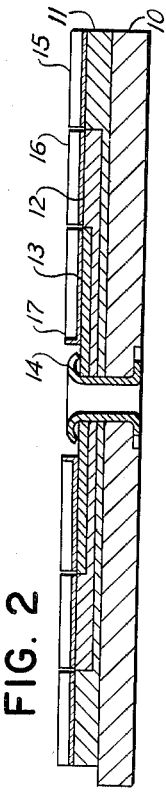
FIG. 2
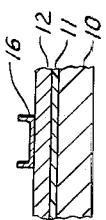
FIG. 3
FIG. 1
INVENTOR.
Hyman Benson
BY
Raymond R. Skolnick

United States Patent Office 3,239,951
Patented Mar. 15, 1966

3,239,951
EDUCATIONAL DEVICE OR TOY
Hyman Benson, 2121 Westbury Court, Brooklyn, N.Y.
Original application May 16, 1962, Ser. No. 195,277.
Divided and this application July 9, 1963, Ser. No. 293,678
4 Claims. (Cl. 35—74)

This invention relates to educational devices or toys and more particularly to word or numbering matching and forming devices which have interchangeable indicia. This is a divisional application of my copending patent application Serial Number 195,277, now abandoned, which was filed on May 16, 1962, entitled "Rotatable Selective Matching Device With Changeable Indicia."

Heretofore, educational devices or toys of this character have been limited in the capacity of words that could be matched and formed. The words or letters were printed or painted on a board or wheel and a child or adult person would match the words or letters to form words or sentences.

It is therefore an object of this invention to provide an improved means for teaching how to form and recognize words, numbers and simple sentences.

Another object of this invention is to provide an educational device for illustrating various combinations of prefixes, suffixes and roots of words.

A still further object of this invention is to provide an educational device where the words, numbers or symbols are readily interchangeable and the combinations that can be formed are almost infinite.

To these ends the invention contemplates the use of three concentric rotatable discs. A pair of these concentric discs are affixed to a base in tangent juxtaposition with each other. Each of the rotating discs have a plurality of parallel spaced guide means for retaining and positioning indicia. The indicia are readily interchanged in the guide means and the rotation of the discs are utilized for lining up or matching the indicia of one disc to the indicia of another disc.

The invention has other objects and advantages which will appear from the following description of a particular embodiment of the invention in conjunction with the accompanying drawings, in which:

FIG. 1 is a plan view of the invention showing various indicia in use;

FIG. 2 is a side sectional view of the invention showing the concentric rotatable discs taken along line 2—2 of FIG. 1; and FIG. 3 is a side sectional view showing the guide means taken along line 3—3 of FIG. 1.

With reference to the drawings there is provided a base 10 upon which three concentric discs, 11, 12 and 13 are rotatably mounted by means of an eyelet 14. On the outer disc 11 are mounted guide means 15. There are ten guide means each of which is radially displaced by 36°. On the middle disc 12 are mounted guide means 16. These are spaced the same as the guide means 15. On the inner disc 13 are guide means 17 which are also spaced the same as guide means 15 and 16.

Rotatably mounted to the base 10 is another set of concentric discs similar to the one described. This second set of discs (unnumbered) are in tangent juxtaposition with the first set whereby the guide means of the first set of discs line up with the guide means of the second set of discs.

Within the guide means there are slideable mounted indicia. These indicia are used to indicate words, sentences, pictorial representations, mathematical expressions, etc. As shown in FIG. 1 the indicium 18, in guide means 15, spells the word chair, in English. The indicium 19, in guide means 16, shows a picture of a chair and the indicium 21, in guide means 17, spells the word chaise which is French for chair. In this manner one wishing to learn a foreign language can match up the English word to the foreign word or to a pictorial representation by rotating the different discs until they line up and match words with other words or pictures.

Where compound words are to be taught such as blackball or blacksmith the indicia shown as 22 and 23 or 22 and 24 are utilized. The middle disc is rotated and the indicium 22 is matched with either indicium 23 or 24 which are on the outer disc.

If it is desired to teach simple sentences such as shown on the indicia 25, 26, 27, 28, 29 and 31 the discs are manipulated until sentences are formed.

The particular embodiment shown and described allows similar or varied indica pieces to be matched to other analogous indicia pieces in varied combinations such as letter to letter, letter to letters, words to words, words to illustrations or symbols, numbers to numbers, numbers to symbols, words or illustrations, words to legends, etymological root words to prefixes or suffixes, or combining forms. The device also allows the matching of colors, designs, patterns, etc.

Depending upon what is to be shown and taught the inner disc 13 can be used in combination with the middle disc 12 or the middle disc 12 can be used in combination with the outer disc 11. Each set of concentric discs can be utilized independently of each other or can be used in combination with each other to form more complex illustrations.

Although I have described a particular embodiment of the invention, it is understood that the present disclosure has been made by way of example and that numerous changes in the details of construction and the combination and arrangement of parts may be resorted to without departing from the spirit and the scope of the invention as hereinafter claimed.

What is claimed is:

1. An educational device comprising, a plurality of concentric discs, a means for rotatably fastening said concentric discs about one central point, a plurality of pairs of parallel and equally spaced open ended guide means fastened to each of said concentric discs, said pairs of guide means being in a similar spaced relationship on said concentric discs, the ends of the guide means on any one disc tangent to the ends of the guide means of any adjoining discs and a plurality of interchangeable indicia of uniform height slideably mounted in said guide means in aligned register.

2. An educational device comprising, a base, a disc rotatably fastened to said base, a second disc rotatably fastened to said base in tangent juxtaposition with said first disc, a plurality of pairs of parallel and equally spaced open ended guide means, said pairs of guide means being fixed in spaced relationship to each of said discs and a plurality of interchangeable indicia of uniform height slideably mounted in said guide means in aligned register.

3. An educational device comprising, a base, a plurality of concentric discs, a means for rotatably fastening said concentric discs to said base, a second plurality of concentric discs, a means for rotatably fastening said second plurality of concentric discs to said base, said second concentric discs being in tangent juxtaposition with said first concentric discs, a plurality of pairs of parallel and equally spaced open ended guide means fastened to each of said pairs of concentric discs, said guide means being in a similar spaced relationship on each of said concentric discs the ends of the guide means on any one disc tangent to the ends of the guide means of any adjoining discs and a plurality of interchangeable indicia of uniform height slideably mounted in said guide means in aligned register.

4. An educational device comprising, a base, a disc rotatably fastened to said base, a plurality of pairs of parallel and equally spaced open ended guide means, said pairs of guide means being fixed in spaced relationship to said disc, a plurality of interchangeable indicia of uniform height slideably mounted in said guide means, an additional guide means fastened to said base in tangent juxtaposition with said rotatable disc and additional indicia slideably mounted in said additional guide means in aligned register.

References Cited by the Examiner

UNITED STATES PATENTS

| 375,095 | 12/1887 | Pollard | 35—74 |
| 1,139,329 | 5/1915 | Birch | 35—75 X |
| 2,177,790 | 10/1939 | Scott | 35—74 |

FOREIGN PATENTS

| 730,674 | 5/1932 | France. |
| 325,593 | 2/1930 | Great Britain. |

EUGENE R. CAPOZIO, *Primary Examiner.*

LAWRENCE CHARLES, *Examiner.*